United States Patent Office 3,274,035
Patented Sept. 20, 1966

1

3,274,035
METALLIC COMPOSITION FOR PRODUCTION OF HYGROSCOPIC SMOKE
Lohr A. Burkardt and William G. Finnegan, China Lake, Calif., assignors to the United States of America as represented by the Secretary of the Navy
No Drawing. Filed June 15, 1964, Ser. No. 375,402
4 Claims. (Cl. 149—40)

The invention herein described may be manufactured and used by or for the Government of the United States of America for governmental purposes without the payment of any royalties thereon or therefor.

This invention relates to new compositions for pyrotechnic production of hygroscopic smokes.

Many compositions and methods are known to the art for producing smokes for concealment purposes as well as cloud seeding. A variety of haloid compositions have been made which are said to produce hygroscopic smoke. They consist essentially of an admixture of an oxidant, a fuel, a halogen donor and a halogen receptor. Other substances, which dispersed, have cloud nucleating characteristics include the well-known iodides, silver, lead, and copper, cupro-oxide, copper sulphide, copper selenide, mercury telluride, vanadium pentoxide, silver sulphide, silver nitrate, silver oxide and cadmium telluride. The pyrotechnic generation of zinc, aluminum and magnesium chlorides by the reaction of these metals in powdered form with carbon tetrachloride and hexachloroethane with other additives for the production of smokes for concealment purposes is well-known. These materials have fairly low hygroscopicities. Since dispersion of many of the above-mentioned cloud nucleating materials is accomplished by use of concentrated solutions in spray-type devices, the total effectiveness is reduced. The present invention provides compositions which show as good capability of forming nuclei for cloud seeding as any of the compositions used heretofore, and is simple and easy to obtain.

It is therefore an object of this invention to provide a composition which produces hygroscopic smoke for use in influencing the weather.

Another object is to provide a material which can be used for clearance of fog from large areas such as aircraft runways.

Yet another object is to produce a hygroscopic smoke for inducing precipitation from warm clouds.

Other objects, features and many of the attendant advantages of this invention will become readily appreciated as the same become better understood by reference to the following detailed description:

The present invention is for a composition which upon combustion yields hygroscopic smoke. It comprises a carbonate selected from the group consisting of lithium, sodium, potassium, cesium, rubidium, calcium, magnesium, strontium and barium carbonates and mixtures thereof; a light metal selected from the group consisting of aluminum, magnesium, zinc and zirconium and mixtures thereof; and an inorganic oxidizer selected from the group consisting of nitrates and perchlorates of sodium, lithium, potassium, calcium, barium and strontium; and a polyhalogen compound selected from the group consisting of hexachloroethane and octachloropropane. The percentages used must be such that stoichiometric reactions occur and complete volatilization of the combustion products is obtained.

The following examples better illustrate this invention but should not be considered as limiting.

2

Example I

| Ingredients: | Percent by weight |
|---|---|
| Lithium carbonate | 19.34 |
| Hexachloroethane | 20.66 |
| Aluminum | 20.50 |
| Potassium perchlorate | 39.50 |

This composition burns completely and leaves no residue, i.e., all the reaction products are volatilized. The percentages of lithium carbonate and hexachloroethane may vary from the values stated so long as their mutual proportions remain the same.

The ingredients are blended and compression molded into appropriate containers.

Example II

| Ingredients: | Percent by weight |
|---|---|
| Lithium carbonate | 16.9 |
| Hexachloroethane | 18.1 |
| Aluminum | 22.3 |
| Potassium perchlorate | 42.7 |

The above composition was mixed and pressed into a cylinder one-inch diameter, one-half inch long with a one-fourth inch hole. This cylinder was ignited using a loose packed mixture of 2.42% lithium carbonate, 2.58% hexachloroethane, 32.5% aluminum and 62.50% potassium perchlorate in the hole as an igniter. The composition burned, leaving no residue and producing a white smoke cloud. The solid matter in the cloud was sampled using a cold metal plate and the solid products were identified as aluminum oxide ($Al_2O_3$), potassium chloride ($KCl$) and lithium chloride ($LiCl$). The solid product was quite hygroscopic and absorbed water from the atmosphere, although the relative humidity at the time was probably below 5%.

The decomposition of this new composition may be represented by the following unbalanced equation:

$$Li_2CO_3 + C_2Cl_6 + Al + KClO_4 \xrightarrow{\Delta} LiCl + KCl + Al_2O_3 + CO_2 + CO$$

Obviously many modifications and variations of the present invention are possible in the light of the above teachings. It is therefore to be understood that within the scope of the appended claims the invention may be practiced otherwise than as specifically described.

What is claimed is:

1. The composition which produces hygroscopic smoke comprising an admixture of the following ingredients:

| Ingredients: | Percent by weight |
|---|---|
| Lithium carbonate | 19.34 |
| Hexachloroethane | 20.66 |
| Aluminum | 20.50 |
| Potassium perchlorate | 39.50 |

2. The composition which produces hygroscopic smoke comprising an admixture of the following ingredients:
Aluminum
Potassium perchlorate
Lithium carbonate
Hexachloroethane;
   the percentage of said ingredients being such that upon combustion of said composition a stoichiometric reaction occurs.

3. A composition which produces hygroscopic smoke comprising the following components:

| Components | Parts by weight |
|---|---|
| Pyrotechnic mixture | 1.5 |
| Smoke generating mixture | 1 | said pyrotechnic mixture consisting essentially of aluminum and potassium perchlorate; and said smoke generating mixture consisting essentially of lithium carbonate and hexachloroethane.

4. A composition which produces hygroscopic smoke comprising the following ingredients:
- a carbonate selected from the group consisting of sodium, potassium, cesium, rubidium, calcium, magnesium, strontium and barium carbonates and mixtures thereof;
- a light metal selected from the group consisting of magnesium, zinc, aluminum and zirconium and mixtures thereof;
- an inorganic oxidizer selected from the group consisting of sodium perchlorate, lithium perchlorate, potassium perchlorate, calcium perchlorate, barium perchlorate, strontium perchlorate and the corresponding nitrates, and mixtures thereof;
- a polyhalogen compound selected from the group consisting of hexachloroethane and octachloropropane;
- the percentages of said ingredients being such that upon combustion of the composition a stoichiometric reaction occurs.

References Cited by the Examiner

UNITED STATES PATENTS

| 2,939,780 | 5/1960 | Brock | 149—40 |
| 2,995,526 | 8/1961 | De Ment | 149—40 X |

OTHER REFERENCES

Bebie: Manual of Explosives, Military Pyrotechnics and Chemical Warfare Agents, Macmillan Co., New York, N.Y., page 79.

References Cited by the Applicant

UNITED STATES PATENTS

| 2,756,097 | 7/1954 | Brandau et al. |
| 2,775,515 | 12/1956 | Magram. |
| 2,895,679 | 7/1959 | Elton. |
| 2,934,275 | 4/1960 | Ball. |
| 2,993,648 | 7/1961 | Blackwell. |
| 3,056,556 | 10/1962 | Sanger et al. |

BENJAMIN R. PADGETT, *Primary Examiner.*